(12) United States Patent
Fujiwara et al.

(10) Patent No.: US 6,463,896 B1
(45) Date of Patent: Oct. 15, 2002

(54) APPARATUS FOR CONTROLLING POSITION OF ELECTROMAGNETICALLY OPERATED ENGINE VALVE

(75) Inventors: Keisuke Fujiwara; Hirofumi Yano, both of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/831,367

(22) PCT Filed: Nov. 28, 2000

(86) PCT No.: PCT/JP00/08347

§ 371 (c)(1),
(2), (4) Date: May 15, 2001

(87) PCT Pub. No.: WO01/42638

PCT Pub. Date: Jun. 14, 2001

(30) Foreign Application Priority Data

Dec. 13, 1999 (JP) ............................................. 11/353226

(51) Int. Cl.[7] .................................................. F01L 9/04
(52) U.S. Cl. .................................. 123/90.11; 123/90.15
(58) Field of Search ............................ 123/90.11, 90.15

(56) References Cited

U.S. PATENT DOCUMENTS 5,596,956 A * 1/1997 Ogawa et al. ............ 123/90.11
6,170,445 B1 * 1/2001 Hattori et al. ............ 123/90.11

FOREIGN PATENT DOCUMENTS

EP       1 008 730       6/2000
JP       10-18820        1/1998

OTHER PUBLICATIONS

Patent Abstract of Japan, 08–170510 (Jul. 2, 1996), Kei Machida, "Electromagnetically Driven Valve Controller for Internal Combustion Engine", 1 page.
Patent Abstract of Japan, 08–261027 (Oct. 8, 1996), Tadahisa Osanawa, "Control Device for Internal Combustion Engine", 1 page.
Patent Abstract of Japan, 09–088644 (Mar. 31, 1997), Hideaki Arai, "Solenoid Driven Valve Control Device for Internal Combustion Engine", 1 page.
Patent Abstract of Japan, 09–195736 (Jul. 29, 1997), Takashi Deo, "Method of Actuating Solenoid Valve", 1 page.

* cited by examiner

Primary Examiner—Weilun Lo
(74) Attorney, Agent, or Firm—Foley & Lardner (57) ABSTRACT

Disclosed is an apparatus for controlling a position of an electromagnetically operated engine valve for an internal combustion engine. During the engine stop, a controller determines whether a cranking operation failure causes the engine stop (a step S1) or an engine stall causes the engine stop (a step S2). In a case where an ignition switch is turned to ON with the engine stop or the ignition switch is turned to OFF with the engine stop due to the failure in the cranking operation, the engine valve (either an intake valve or exhaust valve) is held at a valve open position or a valve closure position for a predetermined period of time based on an engine coolant temperature or the number of times the cranking operations have failed after the engine stops (steps S3 through S8). Thus, it is not necessary to initialize the engine valve at a time of the engine restart during the engine stall or during an idle stop. The engine can quickly be restarted with a power consumption saved.

20 Claims, 9 Drawing Sheets

APPARATUS FOR CONTROLLING POSITION OF ELECTROMAGNETICALLY OPERATED ENGINE VALVE

TECHNICAL FIELD

The present invention relates to a controlling apparatus for controlling a position of an electromagnetically operated engine valve for an internal combustion engine in which a spring is used to bias the engine valve toward a substantially half open position and the engine valve is held at one of two positions viz., at one of closure and open positions before an engine is started.

BACKGROUND ART

A Japanese Patent Application First Publication No. Heisei 10-18820 (JP10018820) published on Jan. 20, 1998 exemplifies a previously proposed electromagnetically operated engine valve for an internal combustion engine.

In the previously proposed electromagnetically operated engine valve, a biasing force exerted by means of a pair of upper and lower springs causes a valve body to the engine valve to be supported at a half open position (also called, a neutral position).

Then, an electromagnetic force is acted upon an armature associated with the valve body so that the valve body is displaced to a valve full open or full closure position. An initialization such as to hold the valve at the valve full open or closure position is carried out before the engine is started.

Thereafter, when the valve is to be opened, the power supply to a valve closing electromagnet is turned off to de-energize the coil portion thereof so that the biasing force of the pair of springs causes the valve body to be moved toward a valve open direction. When the armature approaches sufficiently to a valve opening electromagnet, the power supply to a coil portion of the valve opening electromagnet is turned on to energize the coil portion of the valve opening electromagnet. Thus, the armature is attracted on the valve opening electromagnet and the valve body is held at the full open position.

On the other hand, when the valve is to be closed, the power supply to the valve opening electromagnet is turned off to de-energize the coil portion thereof so that the biasing force exerted by the pair of springs causes the armature to be separated from the valve opening electromagnet and to be moved toward the valve closing electromagnet. When the armature approaches sufficiently to the valve closing electromagnet, the power supply to the valve closing electromagnet is carried out to energize the coil portion of the valve closing electromagnet so that the armature is attracted onto the valve closing electromagnet and the valve body is held at the valve full closure position. As described above, an engine valve open-and-closure control is carried out.

DISCLOSURE OF THE INVENTION

It is natural that, in a case where the engine stops for a relatively long time such as a case where an automotive vehicle in which the above-described engine is mounted parks, at the same time when the engine has been stopped according to a vehicular driver's own decision, the power supply to both of the valve opening and closing electromagnetic coil portions should be turned off so as to save an electric power consumption.

However, suppose a case where the engine is stopped with the ignition switch turned to ON not according to the driver's own decision (so-called, an engine stall). In this case, if the power supply to each of the valve opening and valve closing electromagnet coil portions is turned off, it is necessary to carry out the initialization such that the engine valve is newly held at either the full open position or full closure position when the engine is restarted. Consequently, the electric power has been consumed.

In addition, in an idle stop vehicle for a recent environment measure in which the engine is automatically stopped when the vehicle stops in an engine idling state for such as a signal turn wait, such an initialization as described above needs to be carried out whenever the vehicle is started after the idle stop (the vehicle stops with the engine idling state halted).

This does not only save the power consumption but also make a delay in a vehicle start. This delay in the vehicle start may bring out a promotion of a traffic congestion.

With the above-described problem in mind, it is an object of the present invention to provide an electromagnetically operated engine valve position controlling apparatus for an internal combustion engine which enables a quick restart of the engine, saving an electric power consumption.

According to one aspect of the present invention, there is provided an apparatus for controlling a position of an electromagnetically operated engine valve for an internal combustion engine, comprising: a spring to bias the engine valve at a neutral position of the engine valve between an open position and a closure position thereof; a first electromagnet to attract the engine valve toward the open position and hold the engine valve at the open position when energized; a second electromagnet to attract the engine valve toward the closure position and hold the engine valve at the closure position when energized; a condition determinator to determine whether a predetermined condition required to restart the engine in a period of time shorter than a predetermined period of time after the engine stops is established; and a controller to control a turn on-and-off of a power supply to each of the first and second electromagnets to displace the engine valve between the open and closure positions, the controller being responsive to hold the engine valve at one of the open and closure positions for the predetermined period of time after the engine stops when the condition determinator determines that the predetermined condition required to restart the engine is established.

According to another aspect of the present invention, there is provided an apparatus for controlling a position of an electromagnetically operated engine valve for an internal combustion engine, comprising: a spring to bias the engine valve toward a neutral position between an open position of the engine valve and a closure position thereof; a first electromagnet to attract the engine valve toward the open position and hold the engine valve at the open position when energized; a second electromagnet to attract the engine valve toward the closure position and hold the engine valve at the closure position when energized; an ignition switch; an ignition switch state determinator to determine whether the ignition switch is turned to ON when the engine stops; and a controller to control a turn on-and-off of a power supply to each of the first and second electromagnets to displace the engine valve between the open position and the closure position, the controller being responsive to hold the engine valve at one of the open and closure positions for a predetermined period of time after the engine stops when the ignition switch state determinator determines that the ignition switch is turned to ON when the engine stops.

According to a still another aspect of the present invention, there is provided an apparatus for controlling a position of an electromagnetically operated engine valve for an internal combustion engine, comprising: a spring to bias the engine valve toward a neutral position between an open position of the engine valve and a closure position thereof; a first electromagnet to attract the engine valve toward the open position and hold the engine valve at the open position when energized; a second electromagnet to attract the engine valve toward the closure position and hold the engine valve at the closure position when energized; an ignition switch; an ignition switch state determinator to determine whether the ignition switch is turned to OFF when the engine stops and this OFF state of the ignition switch is caused by a failure in a cranking operation; and a controller to control a turn on-and-off of a power supply to each of the first and second electromagnets to displace the engine valve between the open position and the closure position, the controller being responsive to hold the engine valve at one of the open and closure positions for a predetermined period of time after the engine stops when the ignition switch state determinator determines that the ignition switch is turned to OFF when the engine stops and the OFF state of the ignition switch is caused by the failure in the cranking operation.

This disclosure of the invention does not necessarily describe all necessary features so that the invention may also be a sub-combination of these described

BEST MODE FOR CARRYING OUT THE INVENTION

Reference will hereinafter be made to the drawings in order to facilitate a better understanding of the present invention.

Figures 1A, 1B:
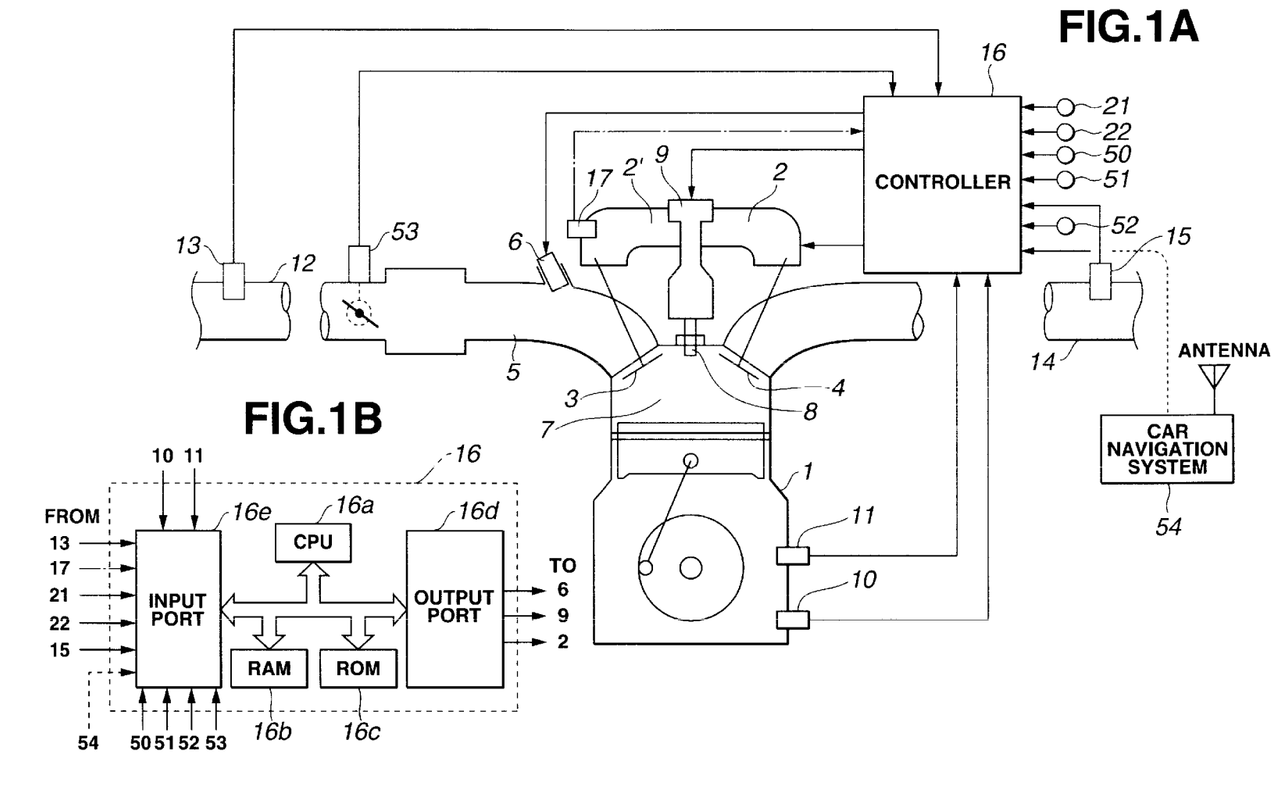
FIG. 1A is a rough configuration view of an internal combustion having an electromagnetically operated intake and exhaust valves mounted in an automotive vehicle to which an electromagnetically operated engine valve position controlling apparatus in a first preferred embodiment according to the present invention is applicable.
FIG. 1B is a rough configuration view of a controller shown in FIG. 1A.

FIG. 1A shows a rough system configuration of an internal combustion engine to which a first preferred embodiment of an electromagnetically operated engine valve position controlling apparatus according to the present invention is applicable.

In FIG. 1A, both an intake valve 3 and an exhaust valve 4 are mounted in engine 1 whose valve open and valve closure positions are drivingly controlled by means of valve drive units 2' and 2, respectively.

A fuel injection valve 6 is attached onto an intake port 5 of each engine cylinder of engine 1. A spark plug 8 and an ignition coil 9 are attached onto a combustion chamber 7 of each cylinder.

In addition, a crank angle sensor 10 is attached onto an engine body to output a reference crank angular signal through a reference crank angular revolution for each cylinder and outputs a unit angular signal whenever an engine crankshaft revolves through a minute crank angle (for example, 1°) and a coolant temperature sensor 11 is attached onto engine body to detect an engine coolant temperature. An airflow meter 13 is installed onto an upstream portion of an intake air passage 12 to detect an intake air quantity. An air-fuel mixture ratio sensor 15 is attached onto an exhaust passage 14 to detect an air-fuel mixture ratio through a detection of oxygen concentration in exhaust gas.

The detection signals from various sensors as described above, ON and OFF positions of an ignition switch 21 and ON and OFF positions of a starter switch 22 are supplied to a controller 16.

Engine controller 16 outputs a pulse train signal to fuel injection valve 6 on the basis of these detection signals to perform a fuel injection quantity-and-timing control. An ignition timing control is carried out by outputting an ignition signal to ignition coil 9 at an appropriate timing.

It is noted that, as will be described later, controller 16 receives output signals from a brake pedal depression sensor 51, a vehicular velocity sensor 52, a throttle valve opening angle sensor 53 with an idle switch, and a car navigation system 54 connected to an antenna.

Furthermore, a valve drive signal is outputted by controller 16 to each of valve drive units 2 (2') in order to perform valve open-and-closure controls for the corresponding intake valve 3 and exhaust valve 4.

FIG. 1B shows a general configuration of controller 16.

Engine controller 16 generally includes a microcomputer having a CPU (Central Processing Unit) 16a, a RAM 16b(Random Access Memory), a ROM 16d (Read Only Memory), an Input Port 16e, an Output Port 16f, and a common bus.

It is off course that Output Port 16f of controller 16 for valve drive units 2 (2') has a drive circuitry to supply an electric power to valve drive units 2 (2').

Figure 2:
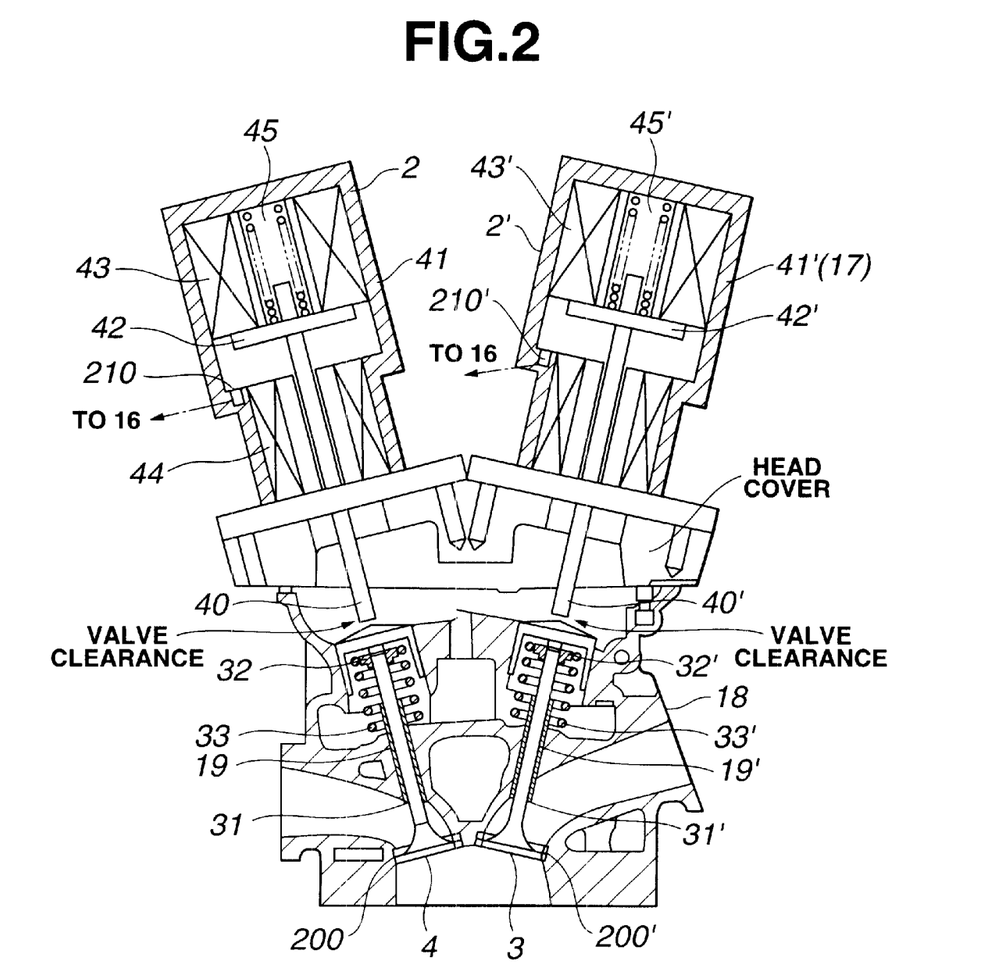
FIG. 2 is a cross sectional view of exhaust and intake valve drive units and exhaust and intake valves of the engine shown in FIG. 1A representing a state where both of the exhaust and intake valves are held at full closure positions.

FIG. 2 shows a hardware structure of valve drive unit 2 (valve drive unit 2') to drive intake valve 3 and exhaust valve 4 to displace the corresponding intake and exhaust valves 4 and 3 between their open and closure positions as will be described later. It is noted that although FIG. 2 indicates that a number of intake valve 3 and the number of exhaust valve 4 are respectively one but a plurality of intake valves and exhaust valves 3 and 4 may be attached onto each cylinder.

In FIG. 2, each of intake valve 3 and exhaust valve 4 is displaceably attached onto a cylinder head 18 in the conventional manner. In details, a stem 31 of exhaust valve 4 is slidably inserted into a valve guide 19 disposed along cylinder head 18. An upper seat 32 is attached onto an upper end of stem 31 via a valve retaining cotter. A valve closing spring 33 is interposed in a space defined between upper seat 32 and a lower seat of cylinder head 18 to bias exhaust valve 4 toward a valve closure direction. The valve closure direction means that a valve body of exhaust (intake) valve 4 (or 3) approaches to a valve seat 200 (200') to block a passage between exhaust (intake) port 14 (5) and combustion chamber 7. It is noted that valve closing spring 33 is compressed by a predetermined distance from a free length. It is noted that each reference numeral with a prime (') shown in FIG. 2 corresponds to a like element with the same reference numeral and, in FIG. 2, intake valve 3 is also at the same full closure position as exhaust valve 4

When, with exhaust valve 4 fully closed, an armature 42 associated with a movable axle 40 (this is also called a plunger or movable element) is attracted and held to a valve closure electromagnet 43 as will be described later, movable axle 40 of valve drive unit 2 is disposed on the same axis as valve stem 31 with a space apart from an upper end portion of stem 31 by a predetermined gap length (in other words, by a predetermined valve clearance). Valve drive unit 2 includes; a housing 41 made of a non-magnetic material; armature 42 integrated to movable axle 40 and housed within housing 41; valve closing electromagnet 43 fixed within housing 41 at a position faced toward an upper surface of armature 42 so as to enable a magnetic attraction to valve closing magnet 43; a valve open electromagnet 44 fixed within housing 41 at a position facing toward a lower surface of armature 42 so as to enable exhaust valve 4 to open with armature 42 magnetically attracted thereonto; and a valve open spring 45 to bias armature 42 toward a valve half open direction (so-called, neutral position) of exhaust valve 4.

Figure 3A:
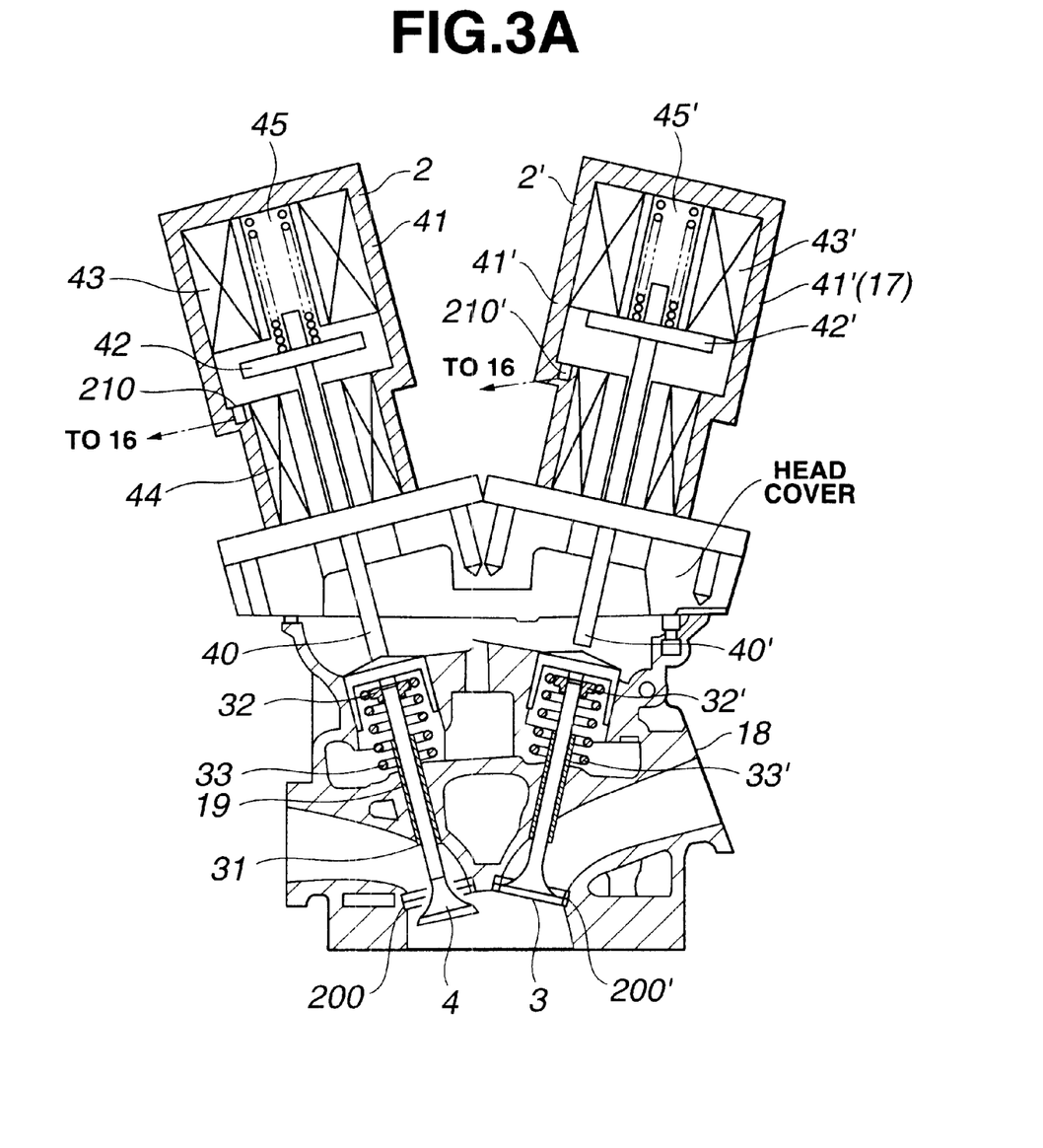
FIG. 3A is a cross sectional view of the exhaust and intake valve drive units and the exhaust and intake valves of the engine shown in FIG. 1A representing a state where the exhaust valve is held at a substantially half position and the intake valve is held at the full closure position.

FIG. 3A shows a state of the engine valve wherein exhaust valve 4 is held at the half open position and intake valve 3 is held at the full closure position.

In details, as shown in FIG. 3A, when both of valve closing electromagnet 43 and valve opening electromagnet 44 are de-energized by means of controller 16, viz., the power supply to both electromagnets 43 and 43 are turned off, electromagnetically operated exhaust valve 4 is displaced toward the half open position.

When, at this state, only valve closing electromagnet 43 is energized, viz., the power supply to only valve closing electromagnet 43 is turned on, armature 42 is magnetically attracted toward valve closing electromagnet 43, compressing valve opening spring 45 and exhaust valve 4 is displaced toward the valve closure position as shown in FIG. 2. This operation is applicable to the case of intake valve 3.

Figure 3B:
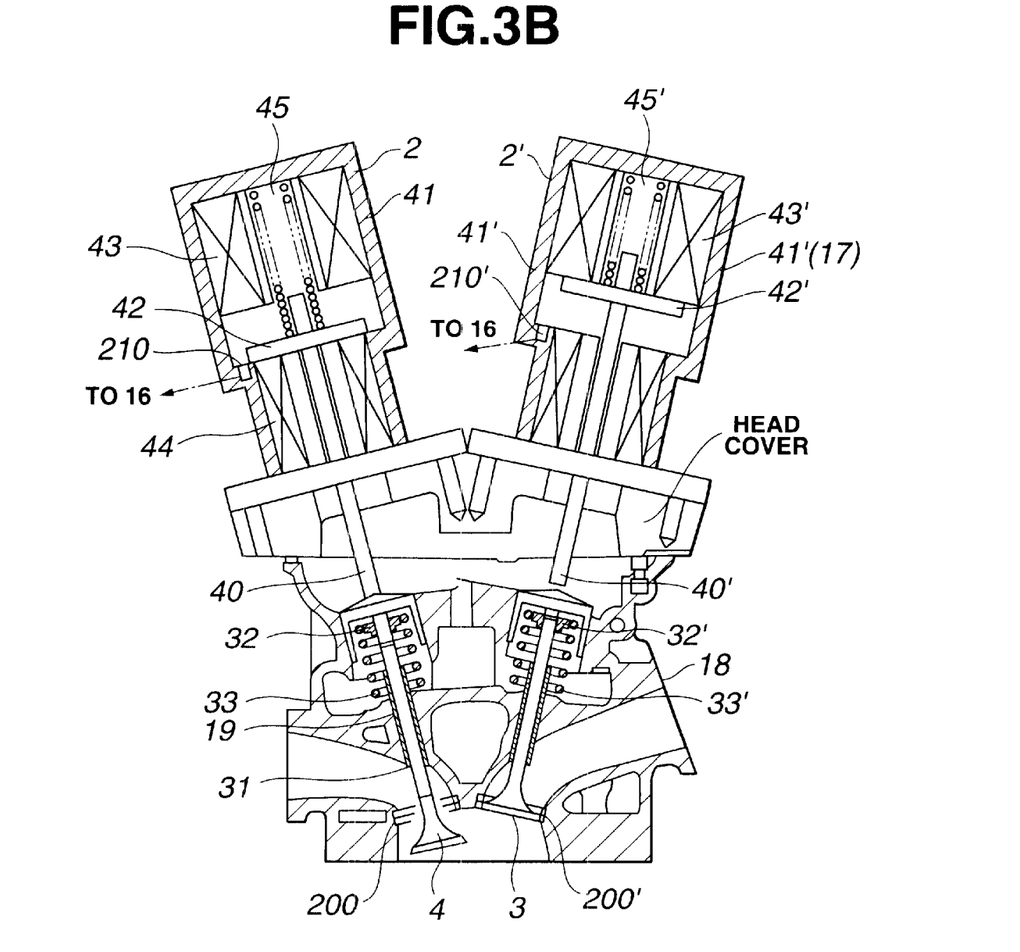
FIG. 3B is a cross sectional view of the exhaust and intake valve drive units and the exhaust and intake valves of the engine shown in FIG. 1A representing a state where the exhaust valve is held at a full open position and the intake valve is held at the full closure position.

FIG. 3B shows a state of the engine valve where exhaust valve 4 is held at the full open position and intake valve 3 is held at the full closure position.

As shown in FIG. 3B, when only valve opening electromagnet 44 is energized, viz., the power supply to only valve opening electromagnet 44 is turned on from the state where exhaust valve 4 is held at the half open position shown in FIG. 3A, armature 42 is magnetically attracted toward valve opening electromagnet 44 and exhaust valve 4 is displaced toward the valve full open position, compressing valve closing spring 33. This operation is also applicable to the case of intake valve 3.

As described above with reference to FIGS. 3A and 3B, the valve open-and-closure operation of exhaust valve 4 has been explained. The same structure and operations as described above for exhaust valve 4 can be applied to intake valve 3.

It is noted that, in FIGS. 2, 3A, and 3B, a reference numeral 210 (210') denotes a recess for collecting wires from valve open and closing electromagnets 43 and 44 (43' and 44') and for drawing out wires toward controller 16 and valve housing 41 (41') is provided with a passage of the engine lubricating oil and on which the lubricating oil temperature sensor 17 shown in FIG. 1A is disposed.

However, the present invention is not limited to the case where each of intake and exhaust valves 3 and 4 is electromagnetically operated but also applicable to a case where at least one of the engine valves (intake or exhaust valve) is electromagnetically operated.

It is noted that the electromagnetically operated engine valve includes one of exhaust valve 4 and intake valve 3 or each of both of exhaust and intake valves 4 and 3.

Before an engine start, the initialization such as to hold either the valve open (full close) position or the valve closure position of each of intake valve 3 and exhaust valve 4 from the half open position in intake valve 3 and exhaust valve 4 is performed and, thereafter, this cranking is performed.

Under such a predetermined condition as the condition required to make a quick restart of the engine in a very short period of time after the engine stops, each of the intake and exhaust valves 3 and 4 is held to be opened or closed for a predetermined period of time after the engine stops so that the engine restart can quickly be carried out without a new execution of the initialization. Thus, the present invention can achieve the saving of the electrical power consumption due to an elimination of the initialization.

Figure 4:
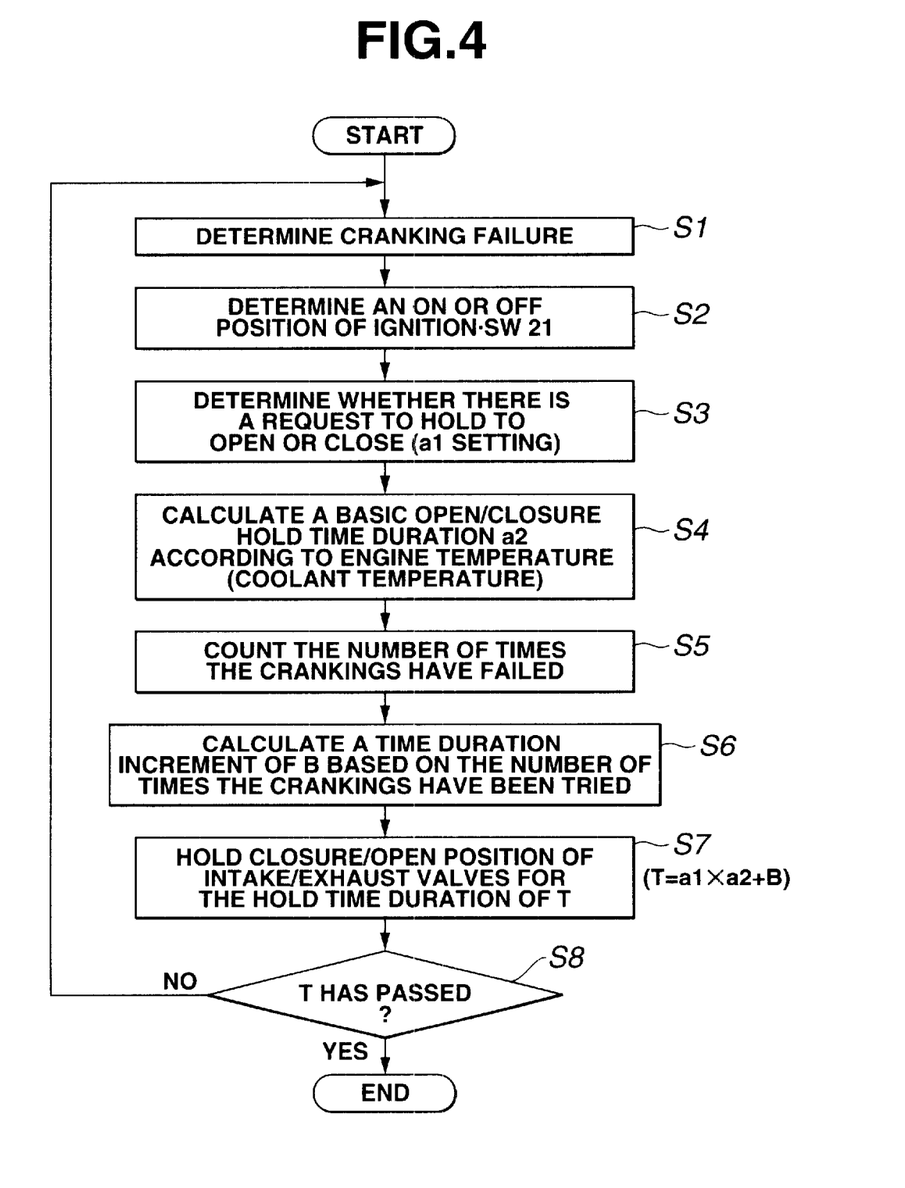
FIG. 4 is an operational flowchart for explaining an operation of the first preferred embodiment of the electromagnetically operated valve controlling apparatus when the engine has stopped.

FIG. 4 shows an operational flowchart to be executed by controller 16 in the first preferred embodiment of the electromagnetically operated engine valve position controlling apparatus.

A program based on the flowchart shown in FIG. 4 is started to be implemented when the engine is stopped (for example, when either of an engine speed Ne or intake air quantity Q indicates a value lower or smaller than a predetermined value).

At a step S1, controller 16 determines whether a cranking operation has failed immediately before (within a predetermined period of time) the stop of engine 1.

For example, when a maximum engine speed after starter switch 22 is turned to OFF from a turn-on state thereof is equal to or below a predetermined value (for example, 500 rpm(revolutions per minutes)), controller 16 determines an occurrence of the failure in the cranking operation.

It is noted that the failure in the cranking operation used in the whole specification means that the engine could not be revolved by itself although the cranking of the engine has been tried to start engine 1.

At a step S2, controller 16 determines whether ignition switch 21 is turned to ON or turned to OFF when engine 1 stops.

At a step S3, controller 16 determines whether the engine valve, viz., electromagnetically operated exhaust and intake valves 4 and 3 should be held at one of the full open position and the full closure position for a predetermined period of time T as will be described later on the basis of results of determinations at steps S1 and S2.

Specifically, when ignition switch 21 is turned to ON and engine 1 has stopped, this means in a generally available vehicle that a, so-called, engine stall occurs. In addition, in an idle stop vehicle, a state where engine 1 has stopped with ignition switch 21 turned to ON corresponds to a state where the engine under the idle state such as a signal turn wait has stopped.

Figure 5:
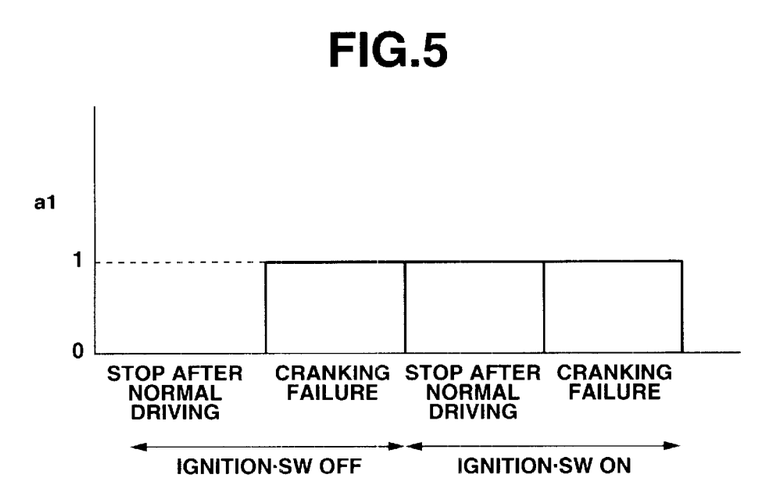
FIG. 5 is a characteristic graph representing an execution determination value a1 shown in FIG. 4.

In either case, since it is necessary to restart engine 1 in a short time, controller 16 determines that each of intake and exhaust valves 3 and 4 should be held to be opened or closed and sets an execution determination value a1 to 1 (refer to FIG. 5).

If ignition switch 21 is turned to OFF and the engine stops, controller 16 determines that the engine is maintained at the stop state for a long period of time if the above described state means that the vehicle driver ends normally the vehicle drive and determines that each of intake and exhaust valves 3 and 4 is not held to be at the open nor closure position so as to save a wasteful power consumption since there is a low probability of a restart of the engine even during intake and exhaust valves 3 and 4 being held to be at the open nor closure position.

However, there is a case where if the cranking operation has failed, ignition switch 21 is naturally turned to ON but ignition switch 21 is once turned to OFF and, thereafter, the cranking is tried again. Therefore, in this case, even if the ignition switch is turned to OFF. The controller 16 determines that each of intake and exhaust valves 3 and 4 is held to be at the open or closure position. Hence, when ignition switch 21 is turned to OFF due to the failure in the cranking operation, the execution determination value is set to "1".

If ignition switch 21 is turned to OFF due to any other reason except the above, controller 16 resets the execution determination value a1 to 0 since each of intake and exhaust valves 3 and 4 is not held to be at the open or closure position (refer to FIG. 5).

Figure 6:
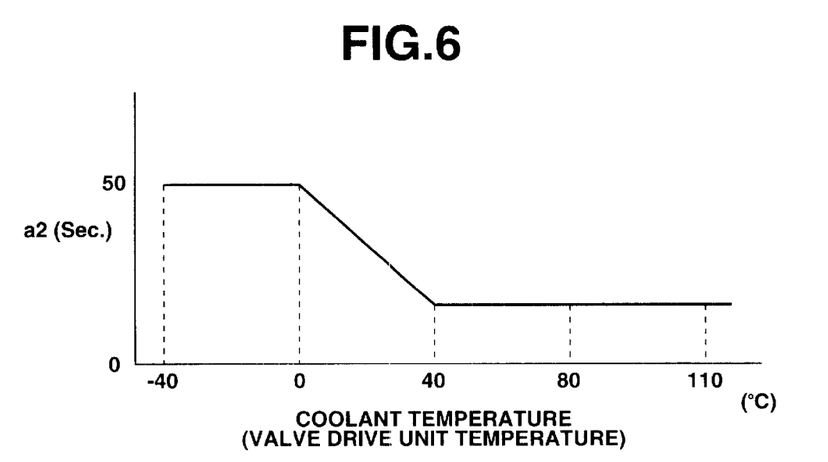
FIG. 6 is a characteristic graph representing a basic valve open or closure hold time duration shown in FIG. 4.

Next, at a step S4, coolant temperature sensor 14 calculates a basic valve open or closure hold time duration (a power supply hold time duration of valve opening electromagnet 43 (43') or valve closure electromagnet 44 (44')) by searching from a table map shown in FIG. 6 on the basis of the coolant temperature detected by coolant temperature sensor 4.

It is noted that to improve an accuracy of the basic valve open or closure hold duration time, a lubricating oil temperature sensor 17 may be disposed in a proximity to valve drive unit 2 (2') to detect a lubricating oil temperature as denoted by a dot-and-dash line in FIG. 1A, in place of coolant temperature sensor 14 or in addition to coolant temperature sensor 14.

At a step S5, controller 16 counts the number of times the cranking operations have been tried (the number of times of the failures in the cranking operations) if controller 16 determines that the reason that the engine has stopped with ignition switch 21 turned to OFF is caused by the failure in the cranking operation.

Figure 7:
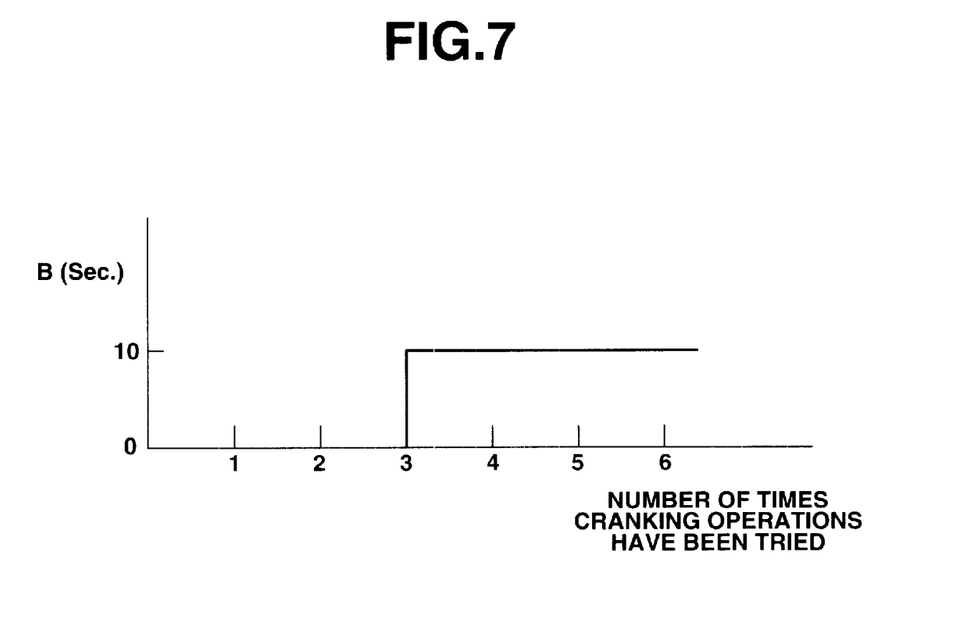
FIG. 7 is a characteristic graph representing a time duration increment B when a cranking is failed in the first embodiment shown in FIG. 4.

At the next step S6, controller 16 calculates a time increment B by searching from a table map shown in FIG. 7.

Specifically, if the cranking operations have been failed three times or more, time increment B is set to, for example, 10 seconds with a wait for a new trial of the cranking operations for a while taken into consideration.

At the next step S7, controller 16 commands valve drive unit 2 (2') to supply continuously a hold current required to hold each corresponding one of intake and exhaust valves 3 and 4 at the open or closure position to the valve open or closure position to valve opening electromagnet 43 (43') or valve closing electromagnet 44 (44') for an open or closure hold time duration T calculated in the following equation.

That is to say, $$T = a1 \times a2 + B.$$

At the next step S8, controller 16 determines if valve open or closure hold time duration T has passed.

The valve open or closure hold time duration T corresponds to the predetermined period of time.

If this time duration T has not yet passed (No), the routine of FIG. 4 is returned to step S1. If this time duration T has passed (Yes), the routine of FIG. 4 is ended.

Hence, as shown in FIG. 4, when the engine stops normally for the vehicle to park, both of execution determination value a1 and time duration increment B are zeroed so that each of intake and exhaust values 3 and 4 is not held to be at the open or closure position, However, when the engine stops due to the other reason described above, each of intake and exhaust valves 3 and 4 is held to be at the open or closure position for at least calculated valve open or closure hold time duration T ($\neq 0$). Then, when the cranking is failed before the valve open-and-closure hold time duration T has passed, each of intake and exhaust valves 3 and 4 is still held at the open or closure position for valve open and closure hold time duration T calculated again according to the number of times the cranking operations have been tried (a total time) from the time at which the cranking is carried out and failed.

In addition, since each of intake and exhaust valves 3 and 4 is held at the open or closure position is necessary to restart the engine in the short period of time in such a case as the engine stall, the idling stop, or the failure in the cranking, the engine can be started without the initialization of the intake and exhaust valves during the engine restart. Furthermore, since no wasteful valve open or closure hold is carried out during the normal engine stop, the power consumption can be minimized.

When the present invention applied to the engine idling stop vehicle in which the engine idling state is continued for a certain period of time and, thereafter, the engine stops to save a fuel consumption, a time required to restart the engine can be shortened as compared with the case where the engine restart is carried out after the initialization of each of intake and exhaust valves 3 and 4 is carried out. Consequently, the prevention of the traffic congestion can be contributed thereto.

As described above, since the present invention is applicable to the idle stop vehicle, the idle stop control will be described below.

That is to say, controller 16 determines whether the vehicle velocity is zeroed according to the output signal from vehicular velocity sensor 52, a brake pedal has been depressed on the basis of a result of a comparison between the output signal (a brake pedal depression depth indicative signal) from brake pedal depression sensor 51 and a reference value, and an accelerator pedal is released according to the output signal from, for example, the throttle valve opening angle sensor 53, controller 16 automatically stops engine 1 when determining that the vehicular velocity is zero and the brake pedal has been depressed with the throttle valve fully closed and automatically restarts engine 1 when determining that the depression of the brake pedal has been released or the accelerator pedal has been depressed.

Figure 8:
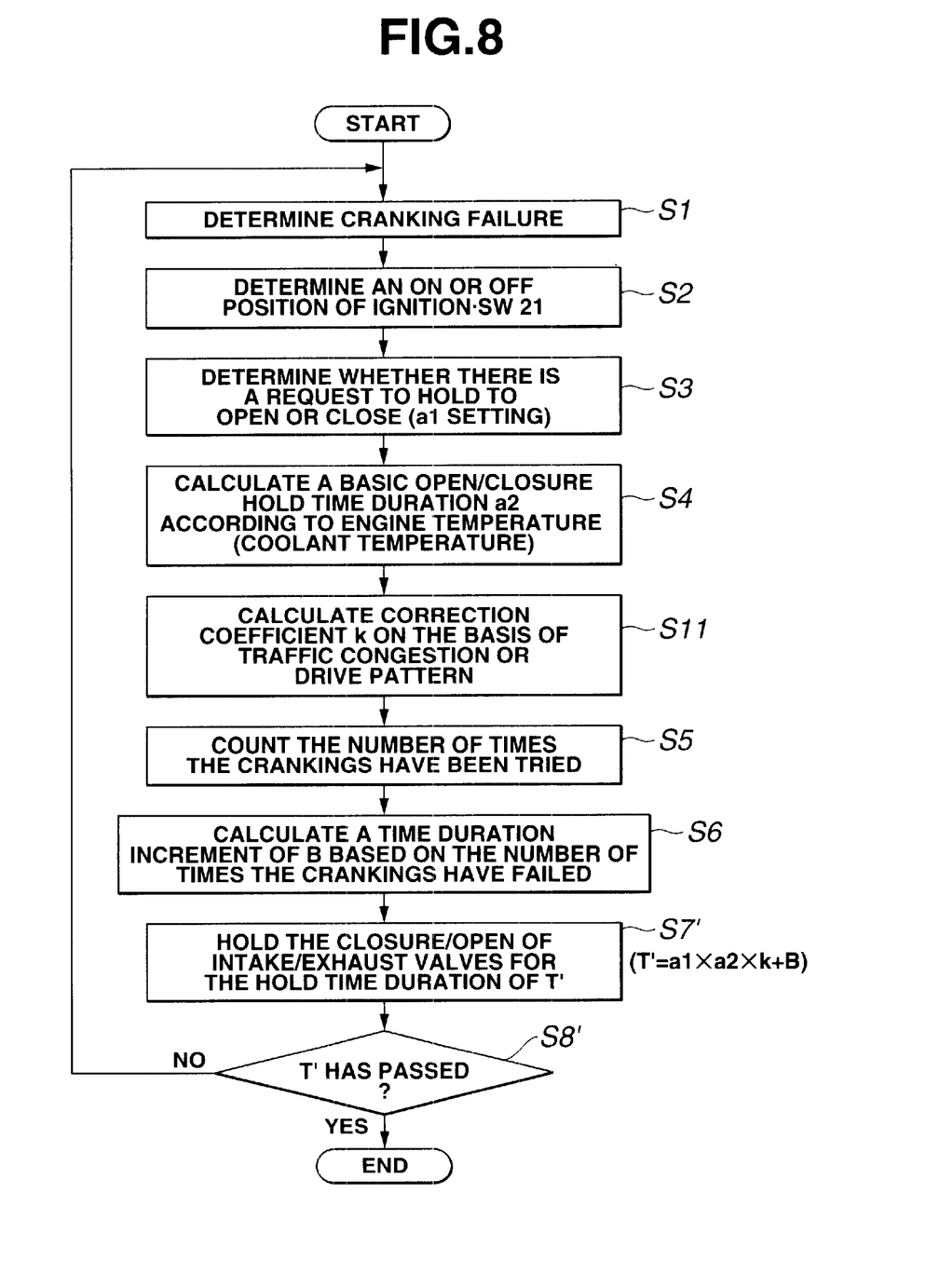
FIG. 8 is an operational flowchart representing an operation of a second preferred embodiment of the electromagnetically operated valve controlling apparatus.

Next, FIG. 8 shows another flowchart for explaining a second preferred embodiment of the electromagnetically operated engine valve position controlling apparatus according to the present invention which is also applicable to the idle stop vehicle in which the car navigation system shown in FIG. 1A is mounted.

A difference in the second embodiment shown in FIG. 8 from the preferred embodiment shown in FIG. 4 lies in the fact that the basic valve open or closure hold time duration a2 is calculated, a correction coefficient k is calculated in accordance with a level of the traffic congestion surrounding a road on which the vehicle stands or a vehicular driving pattern (a continuation time of the engine idling or a congestion frequency) derived from a congestion information from the car navigation system shown in FIG. 1A or stored in a memory such as the ROM 16c shown in FIG. 1B at a new step S11 in FIG. 8.

Figure 9:
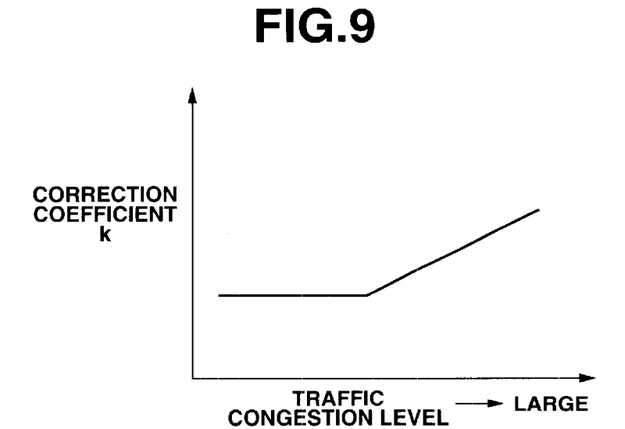
FIG. 9 is a characteristic graph representing a correction coefficient k in the second preferred embodiment shown in FIG. 8.

Then, a final valve open or closure hold time duration T' is calculated in the following equation. Then, at steps S7' and S8', the valve open or closure hold control is carried out. T'=a1×a2×k+B. It is noted that the correction coefficient k (k 1) is set in such a way that as the level of the traffic congestion becomes large, the correction coefficient k becomes large as shown in FIG. 9.

That is to say, since, as the level of the traffic congestion becomes large, a time duration from the time at which the engine stops due to an activation of an idle stop function to the time at which the engine has restarted becomes long, the valve open or closure hold time duration is corrected to the elongated hold time duration T'.

According to the second embodiment shown in FIG. 8, a sufficient valve open or closure hold time duration T' can be secured in accordance with the level of the traffic congestion so that the engine restart under the valve open or closure hold state can quickly be carried out without failure.

It is noted that car navigation system 54 shown in FIG. 1A outputs the traffic congestion information received from the antenna to controller 16. The car navigation system 54 generally displays a present position of the vehicle and an optimum route to reach to a destination together with the present congestion information.

Figure 10:
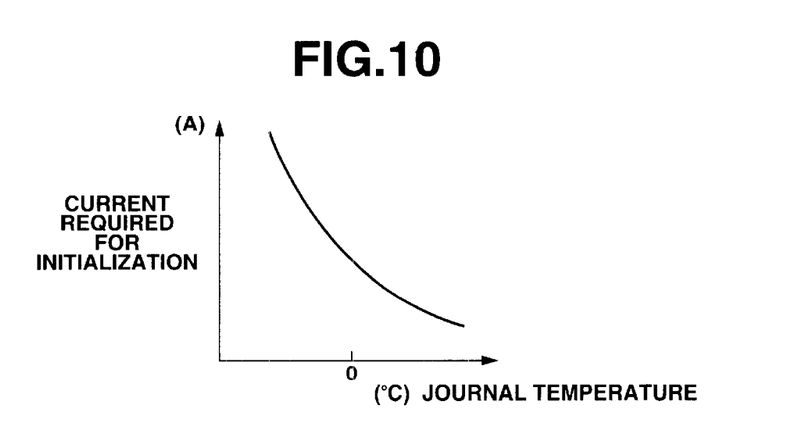
FIG. 10 is a characteristic graph representing an initialization current required to initialize either of the intake valve or exhaust valve shown in FIG. 2.
Figure 11:
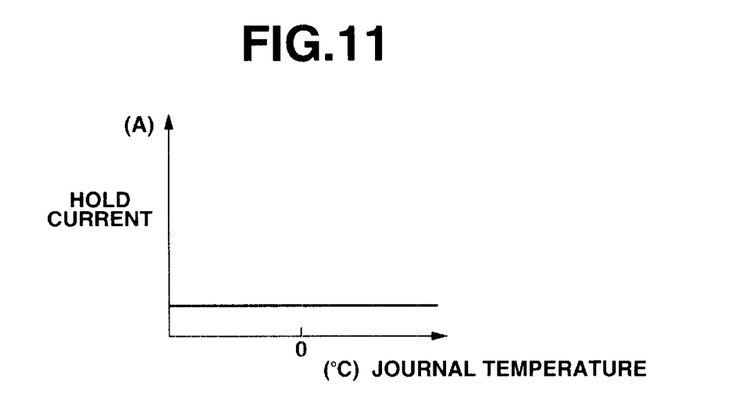
FIG. 11 is a characteristic graph representing a hold current to be supplied to either of valve opening or closing electromagnet shown in FIG. 2.

FIGS. 10 and 11 shows the initialization current required to initialize either of intake or exhaust valves 3 and 4 and hold current required for either of the valve opening or closing electromagnets to hold the corresponding one of intake or exhaust valves 3 and 4 at the valve open or closure position. As shown in FIGS. 10 and 11, the initialization current becomes high as a journal temperature (viz., a temperature of movable axle 40 (40'), this temperature may corresponds to the engine lubricant temperature by oil temperature sensor 17) becomes low but the hold current constantly indicates a smaller valve irrespective of the journal temperature than the initialization current.

The entire contents of Japanese Patent Applications No. Heisei 11-353226 filed in Japan on Dec. 13, 1999 are herein incorporated by reference.

INDUSTRIAL APPLICATION

Although the present invention has been described above by reference to certain embodiment of the invention, the invention is not limited to the embodiments described above.

That is to say, the present invention is not limited to the case where each of the intake and exhaust valves 3 and 4 is electromagnetically operated but also applicable to a case where at least one of the engine valves (intake valve or exhaust valve)is electromagnetically operated.

The electromagnetically operated engine valve includes one of exhaust valve 4 and intake valve 3 or each of both of exhaust and intake valves 4 and 3.

The present invention is applicable to the internal combustion engine mounted in the engine idle stop vehicle and/or the vehicle in which the car navigation system connected to the antenna is mounted.

A spring defined in the claims includes both of valve closing spring 43 (43') and valve opening spring 33 (33') and open position and the closure position defined in the claims include the full open position and the full closure position.

Modifications and variations of the embodiments described above will occur to those skilled in the art in the light of the above teachings. The scope of the invention is defined with reference to the following claims.

What is claimed is:

1. An apparatus for controlling a position of an electromagnetically operated engine valve for an internal combustion engine, comprising:
   a spring to bias the engine valve at a neutral position of the engine valve between an open position and a closure position thereof;
   a first electromagnet to attract the engine valve toward the open position and hold the engine valve at the open position when energized;
   a second electromagnet to attract the engine valve toward the closure position and hold the engine valve at the closure position when energized;
   a condition determinator to determine whether a predetermined condition required to restart the engine in a period of time shorter than a predetermined period of time after the engine stops is established; and
   a controller to control a turn on-and-off of a power supply to each of the first and second electromagnets to displace the engine valve between the open and closure positions, the controller being responsive to hold the engine valve at one of the open and closure positions for the predetermined period of time after the engine stops when the condition determinator determines that the predetermined condition required to restart the engine is established.

2. An apparatus for controlling a position of an electromagnetically operated engine valve for an internal combustion engine as claimed in claim 1, further comprising an ignition switch and wherein the condition determinator determines whether the predetermined condition such that the ignition switch is turned to ON when the engine stops is established and the controller continues to turn off the power supply to the first electromagnet and continues to turn on the power supply to the second electromagnet to hold the engine valve at the closure position for the predetermined period of time after the engine stops when the condition determinator determines that the predetermined condition such that the ignition switch is turned to ON when the engine stops is established.

3. An apparatus for controlling a position of an electromagnetically operated engine valve for an internal combustion engine as claimed in claim 1, further comprising an ignition switch and wherein the condition determinator determines whether the predetermined condition such that the ignition switch is turned to OFF when the engine stops and the OFF state of the ignition switch is caused by a failure in a cranking operation is established and wherein the controller continues to turn off the power supply to the first electromagnet and continues to turn on the power supply to the second electromagnet to hold the engine valve at the closure position for the predetermined period of time after the engine stops when the condition determinator determines that the predetermined condition such that the ignition switch is turned to OFF when the engine stops and the OFF state of the ignition switch is caused by the failure in the cranking operation is established.

4. An apparatus for controlling a position of an electromagnetically operated engine valve for an internal combustion engine as claimed in claim 3, further comprising a starter switch and wherein the condition determinator further comprises an engine speed detector to detect an engine speed and a maximum engine speed determinator to determine whether a maximum engine speed after the starter switch is turned off from a turn-on state thereof is equal to or lower than a predetermined engine speed and determines that the OFF state of the ignition switch is caused by the failure in the cranking operation when the engine speed determinator determines that the maximum engine speed after the starter switch is turned off from the turn-on state thereof is equal to or lower than the predetermined engine speed.

5. An apparatus for controlling a position of an electromagnetically operated engine valve for an internal combustion engine as claimed in claim 4, further comprising a parameter detector to detect a parameter correlated to a temperature of the engine valve and wherein the controller corrects the predetermined period of time in such a manner that as the parameter becomes low, the predetermined period of time is elongated.

6. An apparatus for controlling a position of an electromagneticaly operated engine valve for an internal combustion engine as claimed in claim 5, wherein the parameter is an engine coolant temperature.

7. An apparatus for controlling a position of an electromagnetically operated engine valve for an internal combustion engine as claimed in claim 5, wherein the parameter is an engine lubricant temperature.

8. An apparatus for controlling a position of an electromagnetically operated engine valve for an internal combustion engine as claimed in claim 5, wherein the condition determinator further comprises a counter to count number of times the cranking operations have failed and the controller corrects the predetermined period of time after the engine stops in accordance with the number of times the cranking operations have failed.

9. An apparatus for controlling a position of an electromagnetically operated engine valve for an internal combustion engine as claimed in claim 8, wherein the controller corrects the predetermined period of time in such a manner that as the number of times the cranking operations have failed are increased, the predetermined period of time is elongated.

10. An apparatus for controlling a position of an electromagnetically operated engine valve for an internal combustion engine as claimed in claim 4, wherein the position controlling apparatus is applied to an automotive vehicle in which the internal combustion engine is mounted has a function such that the engine stops with the ignition switch turned to ON during a vehicular stop.

11. An apparatus for controlling a position of an electromagnetically operated engine valve for an internal combustion engine as claimed in claim 10, wherein when the engine stops by means of the function, the controller corrects the predetermined period of time in accordance with a level of a traffic congestion around a road on which the vehicle stops.

12. An apparatus for controlling a position of an electromagnetically operated engine valve for an internal combustion engine as claimed in claim 11, wherein as the level of the traffic congestion is increased, the predetermined period of time is increased.

13. An apparatus for controlling a position of an electromagnetically operated engine valve for an internal combustion engine as claimed in claim 1, wherein the engine valve comprises an exhaust valve, the neutral position corresponds to a substantially half open position toward which the spring biases the exhaust valve when the power supply to each of the first and second electromagnets is turned off, the open position of the exhaust valve corresponds to a first position of the exhaust valve placed in a range between an opener position than the substantially half open position and a full open position at which the exhaust valve is lifted at a maximum displacement of the exhaust valve, and the closure position of the exhaust valve corresponds to a second position of the exhaust valve placed in a range between a closer position than the substantially half open position and a full closure position at which a valve body of the exhaust valve is seated on a valve seat thereof.

14. An apparatus for controlling a position of an electromagnetically operated engine valve for an internal combustion engine as claimed in claim 1, wherein the engine valve comprises an intake valve, the neutral position corresponds to a substantially half open position at which the spring biases the exhaust valve when the power supply to each of the first and second electromagnets is turned off, the open position of the intake valve corresponds to a first position of the exhaust valve placed in a range between an opener position except the substantially half open position and a full open position at which the exhaust valve is lifted at a maximum displacement of the intake valve, and the closure position of the intake valve corresponds to a second position of the intake valve placed in a range between a closer position than the substantially half open position and a full closure position at which a valve body of the intake valve is seated on a valve seat thereof.

15. An apparatus for controlling a position of an electromagnetically operated engine valve for an internal combustion engine as claimed in claim 1, wherein the engine valve comprises intake and exhaust valves, the spring, the first electromagnet, and the second electromagnet are provided for each of the intake and exhaust valves, the neutral position corresponds to a substantially half open position at which each of the springs for the intake and exhaust valves biases the corresponding one of the intake and exhaust valves when the power supply to each of the first and second electromagnets for the intake and exhaust valves is turned off, the open position of the exhaust valve corresponds to a first position of each of the intake and exhaust valves placed in a range between an opener position than the substantially half open position and a full open position at which the exhaust valve is lifted at a maximum displacement of each of the intake and exhaust valves, and the closure position of each of the exhaust and intake valves corresponds to a second position of each of the exhaust and intake valves placed in a range between a closer position than the substantially half open position and a full closure position at which a valve body of each of the exhaust and intake valves is seated on a valve seat thereof.

16. An apparatus for controlling a position of an electromagnetically operated engine valve for an internal combustion engine, comprising:

a spring to bias the engine valve toward a neutral position between an open position of the engine valve and a closure position thereof;

a first electromagnet to attract the engine valve toward the open position and hold the engine valve at the open position when energized;

a second electromagnet to attract the engine valve toward the closure position and hold the engine valve at the closure position when energized;

an ignition switch;

an ignition switch state determinator to determine whether the ignition switch is turned to ON when the engine stops; and a controller to control a turn on-and-off of a power supply to each of the first and second electromagnets to displace the engine valve between the open position and the closure position, the controller being responsive to hold the engine valve at one of the open and closure positions for a predetermined period of time after the engine stops when the ignition switch state determinator determines that the ignition switch is turned to ON when the engine stops.

17. An apparatus for controlling a position of an electromagnetically operated engine valve for an internal combustion engine as claimed in claim 16, wherein the position controlling apparatus is applied to an automotive vehicle in which the internal combustion engine is mounted has a function of stopping the engine with the ignition switch turned to ON during a vehicular stop.

18. An apparatus for controlling a position of an electromagnetically operated engine valve for an internal combustion engine as claimed in claim 17, wherein the controller corrects the predetermined period of time after the engine stops in accordance with a level of a traffic congestion surrounding a road on which the vehicle stops.

19. An apparatus for controlling a position of an electromagnetically operated engine valve for an internal combustion engine, comprising:

a spring to bias the engine valve toward a neutral position between an open position of the engine valve and a closure position thereof;

a first electromagnet to attract the engine valve toward the open position and hold the engine valve at the open position when energized;

a second electromagnet to attract the engine valve toward the closure position and hold the engine valve at the closure position when energized;

an ignition switch;

an ignition switch state determinator to determine whether the ignition switch is turned to OFF when the engine stops and the OFF state of the ignition switch is caused by a failure in a cranking operation; and a controller to control a turn on-and-off of a power supply to each of the first and second electromagnets to displace the engine valve between the open position and the closure position, the controller being responsive to hold the engine valve at one of the open and closure positions for a predetermined period of time after the engine stops when the ignition switch state determinator determines that the ignition switch is turned to OFF when the engine stops and the OFF state of the ignition switch is caused by the failure in the cranking operation.

20. An apparatus for controlling a position of an electromagnetically operated engine valve for an internal combustion engine as claimed in claim 19, wherein the controller corrects the predetermined period of time after the engine stops in accordance with number of times the cranking operations have failed.

* * * * *